United States Patent [19]

Budzich

[11] 4,075,842

[45] Feb. 28, 1978

[54] LOAD RESPONSIVE FLUID CONTROL SYSTEM

[76] Inventor: Tadeusz Budzich, 80 Murwood Dr., Moreland Hills, Ohio 44022

[21] Appl. No.: 771,080

[22] Filed: Feb. 23, 1977

Related U.S. Application Data

[63] Continuation of Ser. No. 729,696, Oct. 5, 1976, Pat. No. 4,028,889, and a continuation-in-part of Ser. No. 559,818, Mar. 19, 1975, Pat. No. 3,984,979, and Ser. No. 655,561, May 2, 1976.

[51] Int. Cl.[2] .............................................. F16H 39/46

[52] U.S. Cl. ........................................ 60/445; 60/459; 60/484; 137/596.13

[58] Field of Search ................................ 91/412, 446; 137/596.13, 596.2; 60/459, 468, 484, 445

[56] References Cited

U.S. PATENT DOCUMENTS

| | | | |
|---|---|---|---|
| 3,398,650 | 8/1968 | Garnjost | 137/117 X |
| 3,455,210 | 7/1969 | Allen | 137/596.13 X |
| 3,470,694 | 10/1969 | Budzich | 60/452 X |
| 3,488,953 | 1/1970 | Haussler | 137/596.13 X |
| 3,744,517 | 7/1973 | Budzich | 137/596.2 |
| 3,807,447 | 4/1974 | Masuda | 91/446 X |
| 3,882,896 | 5/1975 | Budzich | 91/446 X |

*Primary Examiner*—Edgar W. Geoghegan

[57] ABSTRACT

A load responsive fluid power multiple load control system using load responsive direction and flow control valves in combination with pump control responding to highest system load. Each direction flow control valve is equipped with a load responsive positive load control which automatically regulates valve inlet pressure to maintain a relatively constant pressure differential between pump inlet pressure and load pressure at a first level and a load responsive negative load control which automatically regulates valve inlet pressure to maintain a relatively constant pressure differential between pump inlet pressure and load pressure at a second higher level. The load responsive control of each direction control valve blocks the pump flow to the motor while controlling negative load, providing the motor inlet with fluid from the motor exhaust.

13 Claims, 4 Drawing Figures

LOAD RESPONSIVE FLUID CONTROL SYSTEM

This is a Continuation of application Ser. No. 729,696, filed Oct. 5, 1976 for "Load Responsive Fluid Control System", now Pat. No. 4,028,889 and a continuation in part of applications Ser. No. 559,818 filed Mar. 19, 1975 now Pat. No. 3,984,979 for "Load Responsive Fluid Control Valves" and Ser. No. 655,561 filed May 2, 1976 for "Load Responsive Fluid Control System."

BACKGROUND OF THE INVENTION

This invention relates generally to load responsive fluid control valves and to fluid power systems incorporating such valves, which systems are supplied by a single fixed or variable displacement pump. Such control valves are equipped with an automatic load responsive control and can be used in a multiple load system, in which a plurality of loads are individually controlled under positive and negative load conditions by separate control valves.

In more particular aspects this invention relates to direction and flow control valves capable of controlling simultaneously a number of loads under both positive and negative load conditions.

In still more particular aspects this invention relates to direction and flow control valves capable of controlling simultaneously multiple positive and negative loads, which while controlling a negative load interrupt pump flow to the motor providing the motor inlet with fluid from the pressurized system exhaust.

In still more particular aspects this invention relates to direction and flow control valves which utilize pressure differential between valve inlet and load pressures as a control signal while controlling both positive and negative loads.

Closed center load responsive fluid control valves are very desirable for a number of reasons. They permit load control with reduced power losses and therefore, increased system efficiency and when controlling one load at a time provide a feature of flow control irrespective of the variation in the magnitude of the load. Normally such valves include a load responsive control, which automatically maintains pump discharge pressure at a level higher, by a constant pressure differential, than the pressure required to sustain the load. A variable orifice, introduced between pump and load, varies the flow supplied to the load, each orifice area corresponding to a different flow level, which is maintained constant irrespective of variation in magnitude of the load. The application of such a system is, however, limited by one basic system disadvantage.

Normally in such a system the load responsive valve control can maintain a constant pressure differential and therefore constant flow characteristics when operating only one load at a time. With two or more loads, simultaneously controlled, only the highest of the loads will retain the flow control characteristics, the speed of actuation of lower loads varying with the change in magnitude of the highest load. A fluid control valve for such a system is shown in U.S. Pat. No. 3,488,953 issued to Haussler.

This drawback can be overcome in part by the provision of a proportional valve as disclosed in my U.S. Pat. No. 3,470,694 dated Oct. 7, 1969 and also in U.S. Pat. No. 3,455,210 issued to Allen on July 15, 1969. However, while those valves are effective in controlling positive loads they do not retain flow control characteristics when controlling negative loads, which instead of taking supply the energy to the fluid system and hence the speed of actuation of such a load in a negative load system will vary with the magnitude of the negative load. Especially with socalled overcenter loads, where a positive load may become a negative load, such a valve will lose its speed control characteristics in the negative mode.

This drawback can be overcome by the provision of a load responsive fluid control valve as disclosed in my U.S. Pat. No. 3,744,517 issued July 10, 1973 and my U.S. Pat. No. 3,882,896 issued May 13, 1975. However, while these valves are effective in controlling both positive and negative loads, with pump pressure responding to the highest pressure of a system load being controlled, they utilize a controlling orifice located in the motor exhaust during negative load mode of operation and therefore control the fluid flow out of the fluid motor. These valves also during control of negative loads supply the motor inlet with throttled down fluid from the pump circuit, therefore using flow from the pump, while controlling a negative load. In certain fluid power control systems it is preferable, while controlling a negative load, to supply fluid to the motor inlet from the motor exhaust circuit instead of using pump capacity.

These drawbacks can be overcome in part by provision of fluid control valves as disclosed in U.S. Pat. No. 3,807,447 issued to Masuda on Apr. 30, 1974. However, while these valves utilize actuator exhaust fluid for actuator inlet flow requirement when controlling negative loads and also utilize a controlling orifice located between the pump and the actuator while controlling positive and negative loads they regulate actuator inlet pressure by bypassing fluid to a down stream load circuit. Masuda's valves and their proportional control system are based on series type circuit in which excess fluid flow is successively diverted from one valve to the other and in which loads arranged in series determine the system pressure. In such a system flow to the last valve operating a load must be delivered through all of the bypass sections of all of the other system valves, resulting in fluid throttling loss. These valves are not adaptable to simultaneous control of multiple loads in parallel circuit and they do not provide system load control pressure signal to the pump flow control mechanism.

SUMMARY OF THE INVENTION

It is therefore a principal object of this invention to provide a load responsive fluid control system in which improved load responsive fluid direction and flow control valves block system pump from motor inlet and supply it with system exhaust flow when controlling negative loads, while transmitting control signals to system pump to maintain the pressure of the system pump higher, by a constant pressure differential, than the highest pressure of the system positive load being controlled.

Another object of this invention is to provide a load responsive fluid control system in which load responsive fluid direction and flow control valves are provided with a pressurized exhaust manifold, flow from which supplies the inlet flow requirements of motors controlling negative loads, the system pump being utilized to prevent pressure in the exhaust manifold dropping below a certain predetermined level.

It is a further object of this invention to provide a load responsive fluid control system in which load responsive fluid direction and flow control valves retain their control characteristics during control of positive and negative loads, while responding to a pressure differential developed across a variable orifice located between the pump and the actuator.

Briefly the foregoing and other additional objects and advantages of this invention are accomplished by providing a novel load responsive fluid control system for use during proportional simultaneous control of multiple positive and negative loads. A system pump is controlled in respect to pressure signal transmitted from system valves, corresponding to the highest system load pressure. Exhaust circuit of the system is pressurized, the exhaust flow being used to provide inlet flow requirements of motors controlling negative loads. Valve controls during control of positive and negative loads respond to pressure differential developed across a variable orifice in the actuator inlet.

Additional objects of this invention will become apparent when referring to the preferred embodiments of the invention as shown in the accompanying drawings and described in the following detailed description.

DESCRIPTION OF THE PREFERRED EMBODIMENTS

Figure 1:
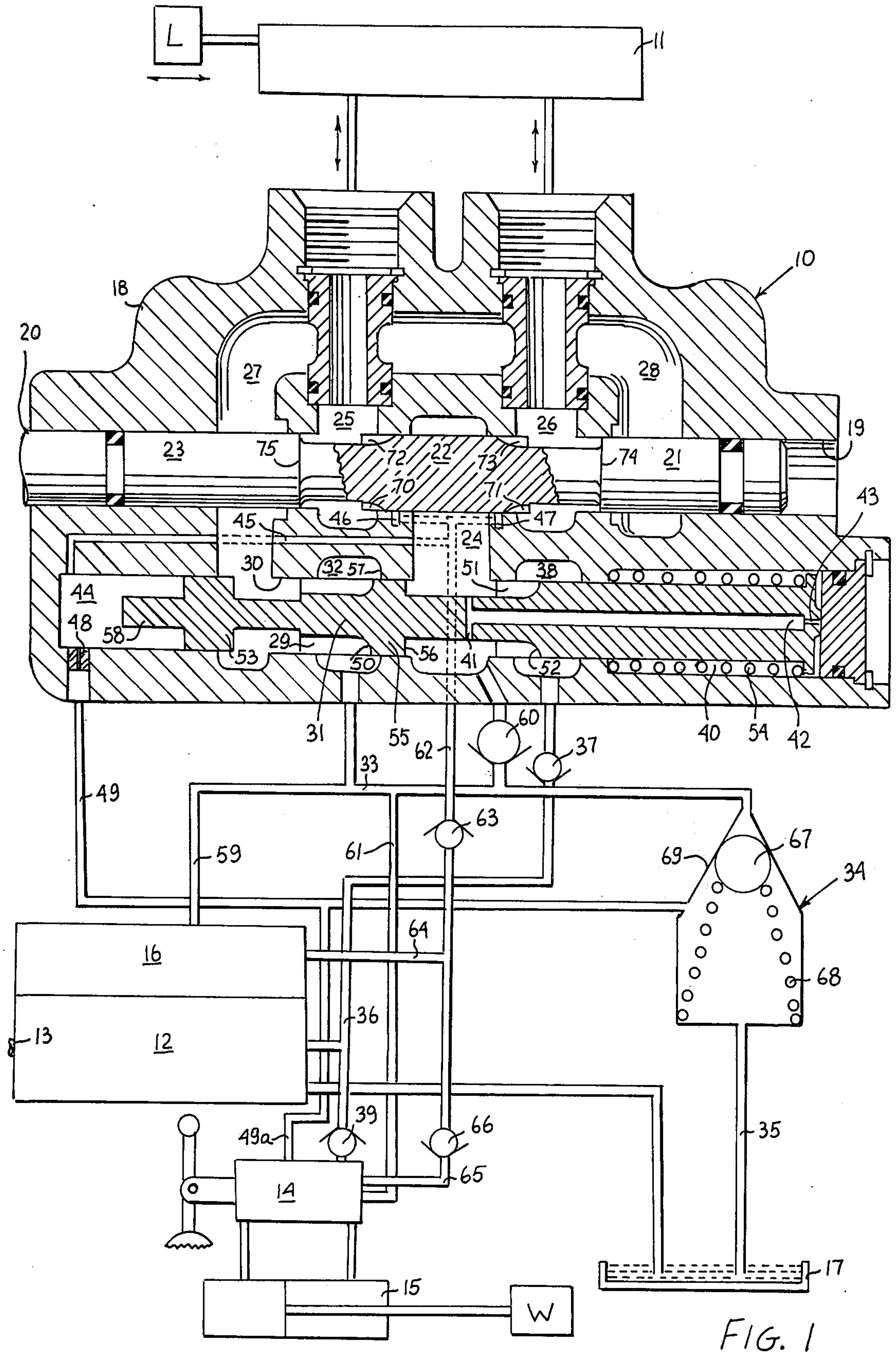
FIG. 1 is a longitudinal sectional view of an embodiment of a flow control valve having a positive and negative load control responsive to actuator upstream pressure differential for use in load responsive fluid control system, with lines, differential pressure relief valve, fixed displacement pump, second load responsive valve, exhaust relief valve and system reservoir shown diagramatically.

Referring now to the drawings and for the present to FIG. 1, embodiment of a flow control valve, generally designated as 10, is shown interposed between a diagramatically shown fluid motor 11 driving load L and a pump 12 of a fixed displacement type driven through a shaft 13 by a prime mover not shown.

Similarly, a flow control valve 14, indentical to flow control valve 10, is interposed between a diagramatically shown fluid motor 15 driving a load W and the pump 12. Fluid flow from the pump 12 to flow control valves 10 and 14 is regulated by a differential pressure relief valve 16, which can be mounted as shown on the pump 12, or be an integral part of the flow control valve 10. The differential pressure relief valve 16, when integrated into the flow control valve 10, is then connected to the pump 12 by line carrying high pressure fluid and line carrying fluid at low pressure. The differential pressure relief valve 16, in a well known manner, by bypassing fluid from the pump 12 to a reservoir 17, maintains discharge pressure of pump 12 at a level, higher by a constant pressure differential, than load pressure developed in fluid motor 11 or 15.

The flow control valve 10 is of a fourway type and has a housing 18 provided with a bore 19 axially guiding a valve spool 20. The valve spool 20 is equipped with lands 21, 22 and 23 which in neutral position of the valve spool 20, as shown in FIG. 1, isolate a fluid supply chamber 24, load chambers 25 and 26 and outlet chambers 27 and 28. The outlet chamber 27 is cross-connected through slots 29 and control bore 30 guiding a control spool 31 to an exhaust chamber 32, which in turn is connected through exhaust line 33, and exhaust relief valve, generally designated as 34, and line 35 to the reservoir 17.

The pump 12 through its discharge line 36 and check valve 37 is connected to a fluid inlet chamber 38. Similarly discharge line 36 is connected through check valve 39 with the inlet chamber of the fluid control valve 14. The control bore 30 connects the fluid inlet chamber 38 with the fluid supply chamber 24, the fluid exhaust chamber 32 and fluid outlet chamber 27. The control spool 31, axially slidable in the control bore 30, projects on one end into space 40 connected to the fluid supply chamber 24 by passages 41 and 42 and restriction orifice 43. The control spool 31 on the other end projects into control space 44 which is connected by passage 45 with the positive load sensing ports 46 and 47 and through leakage orifice 48 and line 49 to down stream pressure of the exhaust relief valve 34. Similarly control space and leakage orifice of the control valve 14 is connected by line 49*a* with line 49 to the down stream pressure of exhaust relief valve 34. The control spool 31 is provided with slots 29 terminating in throttling edges 50 and slots 51 terminating in throttling edges 52 and a sealing land 53 isolating the control space 44. The control spool 31 is biased by a control spring 54 towards position, in which slots 29 connect the outlet chamber 27 with the exhaust chamber 32 and slots 51 connect the fluid supply chamber 24 with the fluid inlet chamber 38. The control spool 31 is also equipped with unloading land 55 having a control surface 56 which isolates, in the position as shown in FIG. 1, the fluid supply chamber 24 from the fluid exhaust chamber 32. Displacement of the unloading land 55 from right to left cross-connects through control surface 56 and flow surface 57 the fluid supply chamber 24 and the fluid exhaust chamber 32, the maximum displacement of the control spool 31 being limited by stop 58.

Excess pump flow from the differential pressure relief valve 16 is delivered through line 59 to the exhaust line 33, which communicates with the exhaust chamber 32, a bypass check valve 60, the exhaust relief valve 34 and through line 61 with all of the exhaust passages of the flow control valve 14. The bypass check valve 60 is interposed between exhaust line 33 and the fluid supply chamber 24.

Positive load sensing ports 46 and 47, located between load chambers 25 and 26 and the supply chamber 24 and blocked in neutral position of valve spool 20 by land 22, are connected through signal passage 62, a check valve 63 and signal line 64 to the differential pressure relief valve 16. In a similar manner positive load sensing ports of flow control valve 14 are connected through line 65, a check valve 66 and signal line 64 to the differential pressure relief valve 16.

The exhaust relief valve, generally designated as 34, interposed between combined exhaust circuits of flow control valves 10 and 14 including bypass circuit of pump 12 and reservoir 17, is provided with a throttling member 67 biased by a spring 68 towards engagement with seat 69.

The land 22 of the valve spool 20 is equipped with signal slots 70 and 71 located in the plane of positive load sensing ports 46 and 47 and metering slots 72 and 73 which in a well known manner can be circumferentially spaced in respect to each other and in respect to the signal slots 70 and 71. Signal slots 70 and 71, in a well known manner, can be substituted by end surfaces of land 22. A suitable device is provided to prevent relative rotation of the spool 20 in respect to bore 19.

The preferable sequencing of the control spool 31 is such that when moved from right to left, when throttling edges 52 close communication between the inlet chamber 38 and the supply chamber 24, control surface 56 is positioned in the plane of flow surface 57, at the point of opening communication between the supply chamber 24 and the exhaust chamber 32, while full flow communication still exists, through slots 29, between the outlet chamber 27 and the exhaust chamber 32. Further movement of the control spool 31 from right to left will gradually close with throttling edge 50, communication between the exhaust chamber 32 and the outlet chamber 27, while full flow communication between the exhaust chamber 32 and the supply chamber 24 is established.

The sequencing of the lands and slots of valve spool 20 preferably is such that when displaced in either direction from its neutral position, as shown in FIG. 1, one of the load chambers 25 or 26 is first connected by the signal slot 70 or 71 to the positive load sensing port 46 or 47 while load chambers 25 and 26 are still isolated from the supply chamber 24 and the outlet chambers 27 and 28. Further displacement of the valve spool 20 from its neutral position connects load chamber 25 or 26 through timing surface 74 or 75 with outlet chamber 28 or 27, while land 22 still isolates the supply chamber 24 from load chambers 25 and 26. Still further displacement of valve spool 20 will connect load chamber 25 or 26 through metering slots 72 or 73 with the fluid supply chamber 24.

As previously described the differential pressure relief valve 16, in a well known manner, will regulate fluid flow delivered from fixed displacement pump 12 to discharge line 36, bypassing the fluid flow to line 59 and exhaust line 33, to maintain the pressure in discharge line 36 higher, by a constant pressure differential, than the highest load pressure signal transmitted through the check valve system to the signal line 64. Therefore with valve spools of flow control valves 10 and 14 in their neutral position blocking positive load sensing ports 46 and 47, signal pressure input to the differential pressure relief valve 16 from the signal line 64 will be at minimum pressure level.

With the fixed displacement pump 12 started up the differential pressure relief valve 16 will bypass through line 59, exhaust line 33, the exhaust relief valve 34 and line 35 all of pump flow to the system reservoir 17 at minimum pressure level equivalent to preload in the spring 68, while automatically maintaining pressure in discharge line 36 at a constant pressure, higher by a constant pressure differential, than pressure in signal line 64 or pressure in line 59, if pressure in line 59 is higher than pressure in signal line 64. Therefore all of pump flow is diverted by the differential pressure relief valve 16 to the low pressure exhaust circuit, as previously described, without being used by flow control valves 10 and 14. Since signal line 64 is connected by passage 45 with control space 44, which in turn is connected through leakage orifice 48, line 49, down stream of exhaust relief valve 34 and line 35 to the reservoir 17, the bypass pressure in the discharge line 36 will be higher, by a constant pressure differential, than the pressure in line 59, which equals the pressure setting of the exhaust relief valve 34. This pump bypaas pressure transmitted through passages 41 42 and restriction orifice 43 to space 40 reacts on the cross-sectional area of control spool 31 and against the bias of control spring 54 moves the control spool 31 from right to left, closing with throttling edges 52 the passage between the inlet chamber 38 and the supply chamber 24. Supply chamber 24 is connected through bypass check valve 60 with pressure existing in exhaust line 33. The pressure setting of exhaust relief valve 34 is so selected that it is higher than pressure necessary to compress the control spring 54 and will move the control spool 31 all the way to the left, where stop 58 engages the housing 18. In this position of the control spool 31 the inlet chamber 38 is isolated from the supply chamber 24, supply chamber 24 is fully connected through displacement of control surface 56 with the exhaust chamber 32 and the exhaust chamber 32 is fully isolated from the outlet chamber 27 by throttling edges 50.

Assume that while constant standby pressure condition is maintained in discharge line 36 the valve spool 20 is initially displaced from left to right to connect the load chamber 25 with the positive load sensing port 46, while lands 21, 22 and 23 still block communication between the supply chamber 24, load chambers 25 and 26 and outlet chambers 27 and 28. Assume also that actuator 11 is subjected to a positive load. Load pressure transmitted from actuator 11, the load chamber 25, the positive load sensing port 46 and signal passage 62, in a well known manner, will open the check valve 63, close the check valve 66 and reacting through signal line 64 on the differential pressure relief valve 16 increase pressure in discharge line 36 to maintain a constant pressure differential between pump pressure in discharge line 36 and load pressure in signal line 64. At the same time the positive load pressure from the positive load sensing port 46 will be transmitted through passage 45 to the control space 44 where, reacting on the cross-sectional area of the control spool 31, will move it from left to right, connecting by throttling edges 52 the supply chamber 24 with the inlet chamber 38. The preload in the control spring 54 is so selected that it is higher than the force developed by the constant control differential of the differential pressure relief valve 16 on the cross-sectional area of the control spool 31. The increased pump discharge pressure will be transmitted through discharge line 36 and check valve 37 to the fluid inlet chamber 38 and through slots 51 to the fluid supply chamber 24. Since constant pressure differential will be maintained by the differential pressure relief valve 16 between space 40 and control space 44, the control spool 31 will be in condition of force equilibrium with the control spring 54 maintaining it in position as shown in FIG. 1.

Assume that from the position in which load chamber 25 is connected to the positive load sensing port 46 the valve spool 20 is further displaced to the right, connecting first the load chamber 26 with the outlet chamber 28 while the load chamber 25 is still isolated from the supply chamber 24. Since the load chamber 26 is subjected to low pressure, no change in the position of the load L or position of valve controls will take place.

Further displacement of the valve spool 20 to the right will connect the load chamber 25 with the fluid supply chamber 24 through the metering slots 72, creating a flow orifice between the supply chamber 24 and the load chamber 25. Since, as previously described, a constant pressure differential is maintained by the differential pressure relief valve 16 between the load chamber 25 and the supply chamber 24, irrespective of the variation in pressure in the load chamber 25, the flow through the metering slots 72 from the supply chamber 24 to the load chamber 25 will be proportional to the area of opening at the metering slots 72. Since the pressure differential across the orifice created by displacement of land 22 is maintained constant, irrespective of the magnitude of the load L, flow from the actuator 11 will be proportional to the area of opening of the metering orifice, which in turn is proportional to displacement of valve spool 20. Therefore when controlling a positive load, flow out of actuator 11 is maintained at a constant level for each specific position of valve spool 20, irrespective of the variation in load L.

Assume that the valve spools of flow control valves 10 and 14 were simultaneously actuated to a position, at which fluid flow is delivered to actuators 11 and 15. Assume also that load W is higher than load L and that both loads are positive. In a well known manner, the higher of the load pressures will be transmitted through the check valve system in the load sensing circuit, the differential pressure relief valve 16 always responding to the highest system load pressure. High pressure due to load W, transmitted from the fluid inlet chamber 38 to the fluid supply chamber 24 and the load chamber 25, will tend to increase speed of the load L and therefore the pressure differential in metering slot 72, thus increasing the pressure differential acting across the control spool 31, above its relatively constant controlled level as dictated by the biasing force of control spring 54. This increase in pressure differential, in a manner as previously described, will react on control spool 31 and will bring it into a modulating position, in which throttling edge 52 will throttle the fluid flow from the fluid inlet chamber 38 to the fluid supply chamber 24, to maintain a constant controlled pressure differential between the load chamber 25 and the supply chamber 24. Therefore, irrespective of the variation in load L or W, or in variation in the pump discharge pressure during control of positive load, the control spool 31 will maintain a constant controlled pressure differential between the load chamber 25 and the supply chamber 24, thus maintaining the flow control feature of the flow control valve 10. In a similar way the flow control feature of flow control valve 14 will be maintained, this flow control feature being retained during simultaneous operation of control valves 10 and 14.

Assume that while constant minimum standby pressure condition is maintained in discharge line 36 and, as previously described, the control spool 31 is maintained in the position fully displaced to the left, the valve spool 20 is initially displaced from left to right connecting the load chamber 25 with positive load sensing port 46 through signal slot 70. Assume also that the actuator 11 is subjected to a negative load, pressurizing the load chamber 26 and maintaining the load chamber 25 at minimum pressure. Therefore pressure signal, transmitted through the positive load sensing port 46, will not change the setting of differential pressure relief valve 16, the pump 12 maintaining discharge line 36 at minimum pressure level, nor will it change position of the control spool 31 which, as previously described, is maintained by pressure in the supply chamber 24 all the way to the left with stop 58 engaging the housing 18. Further movement to the right of valve spool 20 will connect the load chamber 26 with the outlet chambers 28 and 27. The negative load pressure from the load chamber 26 will be transmitted to the outlet chambers 28 and 27 which are blocked from the exhaust chamber 32 by throttling edges 50 of the control spool 31. The control spool 31 will be maintained in this position preventing the flow of the fluid from the actuator 11.

Further movement of valve spool 20 to the right will open communication between the supply chamber 24 and the load chamber 25, through metering slots 72. Fluid flow will take place from the supply chamber 24 into lower pressure zone of the load chamber 25. Rising pressure in load chamber 25, transmitted through positive load sensing port 46 and passage 40 to control space 44, reacting on the cross-sectional area of control spool 31 and biasing force of control spring 54, will balance the force, developed on the cross-sectional area of control spool 31 due to pressure in space 40 and will move the control spool 31 from left to right into a modulating position, in which the control spool 31, by throttling action of throttling edge 50, will maintain a constant pressure differential across the orifice created by displacement of the land 22 and metering slots 72. The pressure in space 40 through passages 42 and 41 is maintained at the same level as pressure in the supply chamber 24, which in turn through action of bypass check valve 60 is maintained at a level as dictated by the setting of the exhaust relief valve 34. Therefore for each position of valve spool 20, corresponding to a specific area of flow through metering slots 72, constant flow will take place from the supply chamber 24 to the load chamber 25, irrespective of the variation in the magnitude of the negative load in the actuator 11. High pressure flow out of actuator 11, during control of negative load, will be controlled by the flow to the other side of actuator through metering slots 72 from exhaust chamber 32 through opening created by displacement of unloading land 55 between the exhaust chamber 32 and the supply chamber 24 and from exhaust line 33 through the bypass check valve 60, at pressure level as dictated by the setting of exhaust relief valve 37, while utilizing a combined exhaust flow from the exhaust chamber 32 and the differential pressure relief valve 16. The exhaust fluid at a relatively constant throttled down pressure is supplied to the actuator inlet during control of negative load, while the fixed displacement pump 12 is completely isolated by throttling edge 52 from the supply chamber 24 and the actuator 11. Therefore, since none of the potential pump delivery is used as actuator make-up fluid during control of negative load, higher pump capacity is made available for simultaneous control of multiple positive loads. The exhaust circuit is also supplied by line 61 with exhaust fluid from the flow control valve 14, the combined exhaust flow of both control valves and the bypass flow from the differential pressure relief valve 16 being available for the make-up flow to the system actuators controlling negative loads, while full pump capacity is being saved for operation of the other positive loads.

When controlling positive loads the control spool 31 moves into a position in which throttling edges 52 throttle fluid flow through slots 51 from the inlet chamber 38 to the supply chamber 24. This position of the control spool 31 corresponds to a certain biasing force of the control spring 54, which in turn corresponds to a certain level of pressure differential between space 40 and control space 44 which, when acting on the cross-sectional area of the control spool 31, develops a force equal and opposite to the biasing force of the control spring 54. Since the linear movement of the control spool 31 in the throttling range while controlling a positive load can be made comparatively small, during the control of positive loads a relatively constant pressure differential is maintained across the control spool 31.

When controlling negative loads the control spool 31 moves into a position in which throttling edges 50 throttle fluid flow through slots 29 from the outlet chamber 27 and the exhaust chamber 32. This new position of the control spool 31 corresponds to higher biasing force of the control spring 54 and therefore a higher relatively constant pressure differential is maintained across control spool 31 during control of negative load.

So far operation of flow control valve 10 has been described when controlling fluid flow to actuator 11 in one direction. The flow control valve 10 is double acting since it is equipped with two positive load sensing ports 46 and 47 and plural metering slots 72 and 73 and can control fluid flow to the actuator 11 in both directions.

Figure 2:
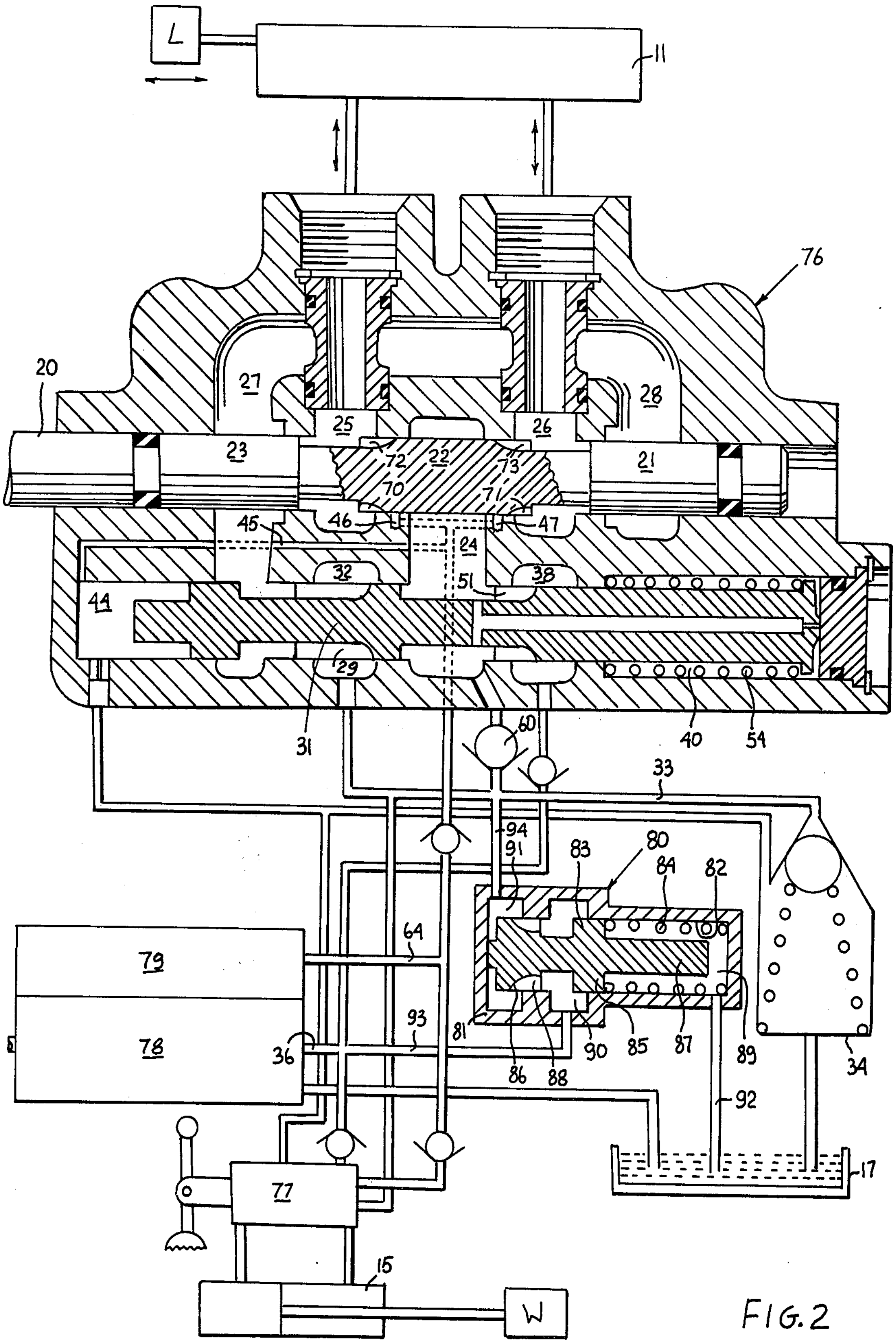
FIG. 2 is a sectional view of an embodiment of flow control valve of FIG. 1 used in load responsive fluid control system with lines, variable displacement pump equipped with differential pressure compensator, second load responsive valve, exhaust relief valve, exhaust pressure reducing valve and system reservoir shown diagramatically.

Referring now to FIG. 2 flow control valves, generally designated as 76 and 77, are identical to those of FIG. 1. The basic function and configuration of flow control valve 76 is the same for flow control valves 10 and 14. Positive load sensing circuit of flow control valves 10 and 76 with their check valve systems are again identical, the positive load pressure of the highest system load being transmitted to signal line 64. A pump 78 is of a variable displacement type and is controlled by a differential pressure compensator 79 which, in a well known manner, varies the displacement of the pump 78 to maintain discharge line 36 at a pressure, higher by a constant pressure differential, than the load signal pressure transmitted to the differential pressure compensator 79 from the load sensing circuit by signal line 64. Therefore in both systems, as shown in FIGS. 1 and 2, by control of pump flow delivered to discharge line 36, a constant pressure differential is maintained between pressure in discharge line 36 and pressure in signal line 64, in response to highest system load being operated. The differential pressure compensator 79 can be an integral part of pump 78 or can be a part of flow control valve 76. If the differential pressure compensator is made part of the flow control valve 76 or independently mounted, it must be connected by suitable lines to discharge line 36, reservoir 17 and by a control signal line to displacement changing mechanism of the variable displacement pump 78. Although the load control features of the systems in FIGS. 1 and 2 are identical, the amount of flow delivered to exhaust circuit and specifically to exhaust line 33 is different for each circuit. In FIG. 1 all of the excess pump flow is delivered by the differential pressure relief valve 16 through line 59 to exhaust line 33, since the pump 12 is of a fixed displacement type. With system valve spools in neutral position all of the pump flow is directed by the differential pressure relief valve 16 to exhaust line 33. In FIG. 2 since the pump 78 is of a variable displacement type, it supplies the exact amount of fluid to satisfy the system demand, none of the pump flow being normally diverted to exhaust line 33. Therefore in the arrangement of FIG. 2 less exhaust flow is available to satisfy inlet flow requirements of system actuators during control of negative loads. Normally an actuator, in the form of a cylinder, due to presence of piston rod, displaces different flows from each cylinder port per unit length displacement of its piston. Therefore, while controlling negative load, the exhaust flow out of the cylinder might be substantially smaller than its inlet flow requirements. Under these conditions, since communication between the inlet chamber 38 and the supply chamber 24 is blocked by the control spool 31, exhaust pressure level, as maintained by exhaust pressure relief valve 34 will drop below atmospheric pressure, the exhaust pressure relief valve 34 will close entirely and cavitation will take place at the inlet side of the cylinder. In a well known manner an anti-cavitation check valve could be provided between exhaust line 33 and reservoir 17, but since it can only function below atmospheric pressure the cavitation condition at actuator inlet would still likely occur and the flow control spool 31 would become inactive. To maintain exhaust line 33 at minimum pressure level, as required by the control spool 31, a pressure reducing valve, generally designated as 80, is provided. Pressure reducing valve 80 has a valve housing 81 provided with a valve bore 82 axially guiding a valve spool 83, which is biased towards position as shown in FIG. 2 by a spring 84. The valve spool 83 is provided with lands 85 and 86, stop 87 and throttling slots 88. The valve housing 81 is provided with space 89 and chambers 90 and 91. Space 89 is connected through line 92 with the reservoir 17. The chamber 90 is connected by line 93 with discharge line 36, which is supplied with fluid under pressure from the pump 78. The chamber 91 is connected by line 94 with exhaust line 33. Fluid under pressure is supplied from pump 78, discharge line 36 and line 93 to the chamber 90 and through throttling slots 88 to the chamber 91, which is connected by line 94 with exhaust line 33. Pressure in the chamber 91 and in the exhaust system will begin to rise and reacting on the cross-sectional area of valve spool 83 will tend to move it from left to right, compressing the spring 84 and closing the passage through throttling slots 88 between chambers 91 and 90. In this way pressure reducing valve 80, will throttle fluid flow from chamber 90 to chamber 91 and therefore to exhaust line 33, to maintain exhaust line 33 at a constant pressure, as dictated by the preload in the spring 84. This constant controlled pressure level is selected below controlled pressure level of exhaust pressure relief valve 34. As long as the exhaust pressure relief valve 34 maintains the exhaust system at its controlled pressure level, communication between chambers 90 and 91, of pressure reducing valve 80, will be closed and no flow from the pump 78 will be diverted into the exhaust circuit, to maintain it at a minimum constant pressure level. However, during control of negative load once the actuator inlet flow requirement will exceed the actuator outlet flow, the exhaust pressure relief valve 34 will close, pressure in the exhaust system will drop to the control pressure setting of the pressure reducing valve 80 and the motor exhaust flow will be supplemented from the pump circuit by the pressure reducing valve 80, to maintain the supply chamber 24 at the required pressure. Therefore during control of negative load only the difference between the actuator inlet flow requirement and the actuator exhaust flow will be supplied to the exhaust circuit from the pump 78. This feature not only improves the efficiency of the system, but greatly extends the capacity of the pump of variable displacement type, to perform useful work in control of positive loads.

Figure 3:
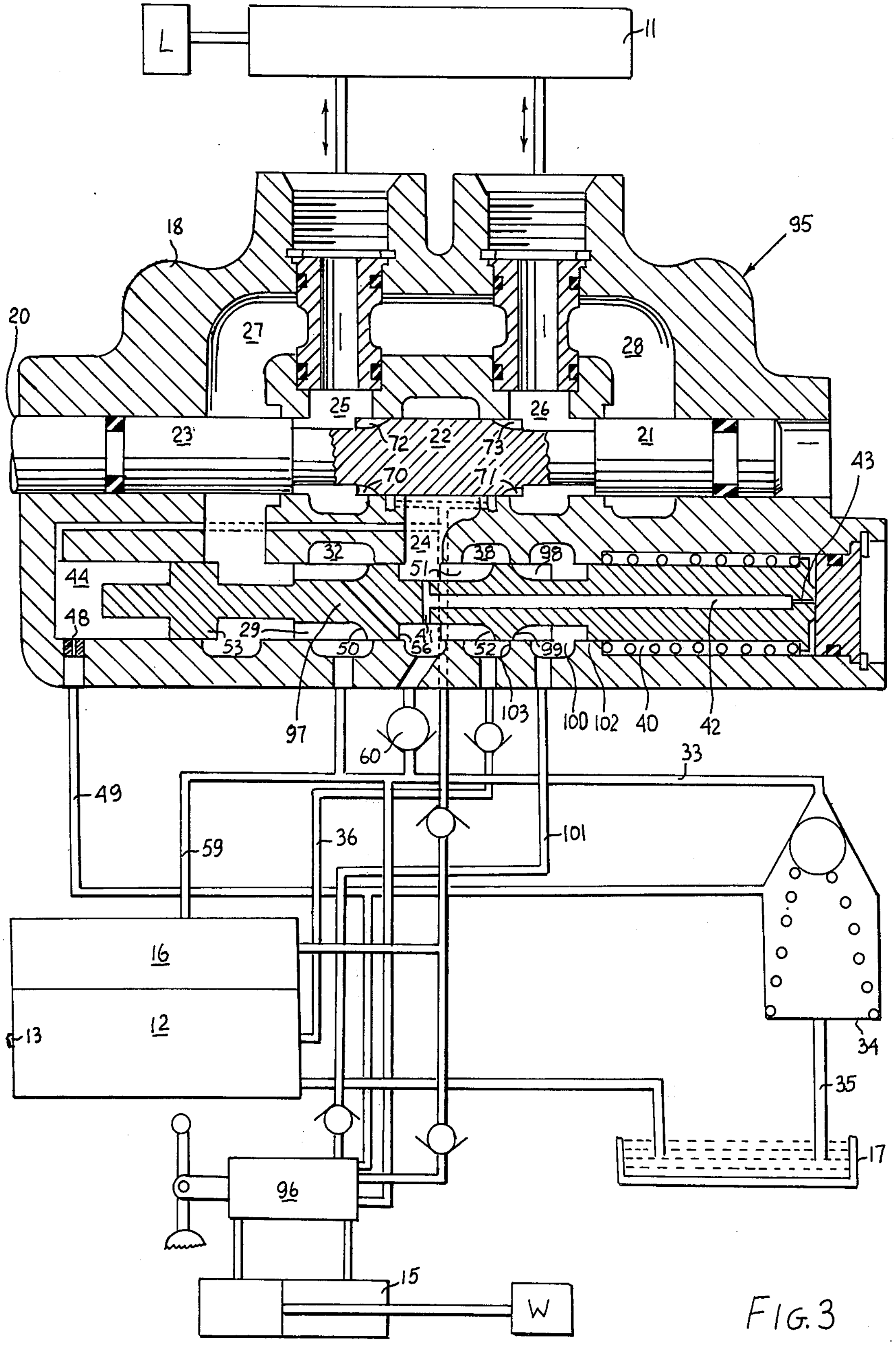
FIG. 3 is a longitudinal sectional view of an embodiment of a flow control valve having a positive load control with priority feature and negative load control, positive and negative load controls being responsive to actuator upstream pressure differential, for use in load responsive fluid control system, with lines, differential pressure relief valve, fixed displacement pump, second load responsive valve, exhaust relief valve and system reservoir shown diagramatically.

Referring now to FIG. 3 control valves, generally designated as 95 and 96, are similar to flow control valves 10 and 14 of FIG. 1 and they perform their control functions in control of loads L and W in a similar way. A control spool 97 of FIG. 3 is similar to the control spool 31 of FIG. 1 and has identical sections for control of positive and negative loads. However, the control spool 97 is also equipped with bypass slots 98 having throttling edges 99 between a bypass chamber 100 and the inlet chamber 38. The bypass chamber 100 is connected through line 101 with inlet chamber of flow control valve 96.

The sequencing of the control spool 97 is such, that when moved from right to left it will first open communication through throttling edge 99 between the inlet chamber 38 and the bypass chamber 100, while full flow passage still exists through slots 51 between the inlet chamber 38 and the supply chamber 24 and through slots 29 between the exhaust chamber 32 and the outlet chamber 27. Further movement of the control spool 97 from right to left will gradually enlarge flow passage between the bypass chamber 100 and the inlet chamber 38, while proportionally reducing flow passage between the inlet chamber 38 and the supply chamber 24, until throttling edge 52 will disrupt communication between the inlet chamber 38 and the supply chamber 24, with control surface 56 positioned in plane of flow surface 57, at the point of opening communication between the supply chamber 24 and the exhaust chamber 32, while full flow communication still exists, through slots 29, between the outlet chamber 27 and the exhaust chamber 32. Further movement of the control spool 97 from right to left will gradually close, with throttling edge 50, communication between the exhaust chamber 32 and the outlet chamber 27, while full flow communication between the exhaust chamber 32 and the supply chamber 24 is established.

The control spool 97 is also equipped with passages 41, 42 and a restriction orifice 43 which connect supply chamber 24 with space 40. A web 102 separates space 40 from the bypass chamber 100. With control spool 97 in position as shown in FIG. 3 throttling edges 99 of slots 98 isolate the bypass chamber 100 from the inlet chamber 38. The configurations of spools 20 and the load sensing circuits of the flow control valves 10 and 14 of FIG. 1 are identical to that of flow control valves 95 and 96 of FIG. 3.

With the pump 12 of fixed displacement type started up, in a well known manner, as previously described, the differential pressure relief valve 16 maintains discharge line 36 at minimum pressure level. Full bypass flow is passed from fixed displacement pump 12 and differential pressure relief valve 16 through line 59 and exhaust line 33 to the exhaust pressure relief valve 34, which maintains, as previously described, the exhaust circuit of the flow control valve 95 at a certain minimum exhaust pressure level. This exhaust pressure is transmitted through the bypass check valve 60 to the supply chamber 24 and through passages 41, 42 and restriction orifice 43 to space 40. Since control space 44 is connected by leakage orifice 48 and line 49 with low pressure zone of reservoir 17, in a manner, as previously described, the pressure differential existing between space 40 and control space 41 will move the control spool 97 all the way from right to left, connecting the inlet chamber 38 with the bypass chamber 100, which is connected by line 101 with inlet chamber of flow control valve 96.

During the control of single or multiple negative or positive loads the flow control valves of FIG. 3 will perform in an identical way as the flow control valves of FIG. 1. There is however one additional function that the flow control valve 95 of FIG. 3 can perform and this relates to priority control feature of the valve.

Assume that during simultaneous control of positive loads L and W by flow control valves 95 and 96 with valve spools moved from left to right, load L becomes the higher of the two. Assume also that the combined flow demand of the flow control valves 95 and 96 will exceed the capacity of the pump 12. Pump pressure in discharge line 36 will start dropping below the level of the constant pressure differential maintained by the differential pressure relief valve 16 and therefore the difference between pressure due to load L and pressure in discharge line 36 will decrease also decreasing throttling pressure differential through metering slots 72. As a result the force equilibrium acting on the control spool 97 will be disturbed. The control spool 97, under action of decreasing force developed on its cross-sectional area by reduced pressure differential existing between the supply chamber 24 and the load chamber 25, will move from left to right, moving throttling edge 52 out of its throttling position and throttling with throttling edge 99 against control surface 103 fluid flow from the inlet chamber 38 to the bypass chamber 100. In this way flow control spool 97, by throttling action of the throttling edge 99, will maintain a constant pressure differential between the load chamber 25 and the supply chamber 24, this constant control differential being maintained by regulating the bypass flow to the actuator 15. Due to this bypass throttling action the flow control valve 95 has a priority feature which permits proportional control of load L, when the combined flow demand of flow control valves 95 and 96 exceeds the flow capacity of the pump 12. If during simultaneous control of loads L and W, load W is the higher of the two and when flow demand of the flow control valves 95 and 96 exceeds the capacity of the pump 12, the system pressure will drop to a level, equivalent to load pressure L, at which time, in a manner as previously described, the control spool 97 will regulate, by throttling with the throttling edge 99, the bypass flow from the inlet chamber 38 to the bypass chamber 100, to maintain a constant pressure differential between the load chamber 25 and the supply chamber 24. Therefore, irrespective of the variation in the magnitude of the loads L and W, during simultaneous operation of flow control valves 95 and 96, once the combined flow demand of the flow control valves exceeds the capacity of the pump 12, the flow control valve 95 always retains the priority feature.

Due to the action of flow passages 41 and 42 and restriction orifice 43 exhaust pressure developed by the exhaust pressure relief valve 34 will always move, in a manner as previously described, the control spool 97 all the way from right to left independent of the position of the valve spool 20. Therefore with valve spool 20 of control valve 95 in its neutral position, communication between the inlet chamber 38 and the bypass chamber 100 will remain wide open, permitting normal operation of flow control valve 96.

Figure 4:
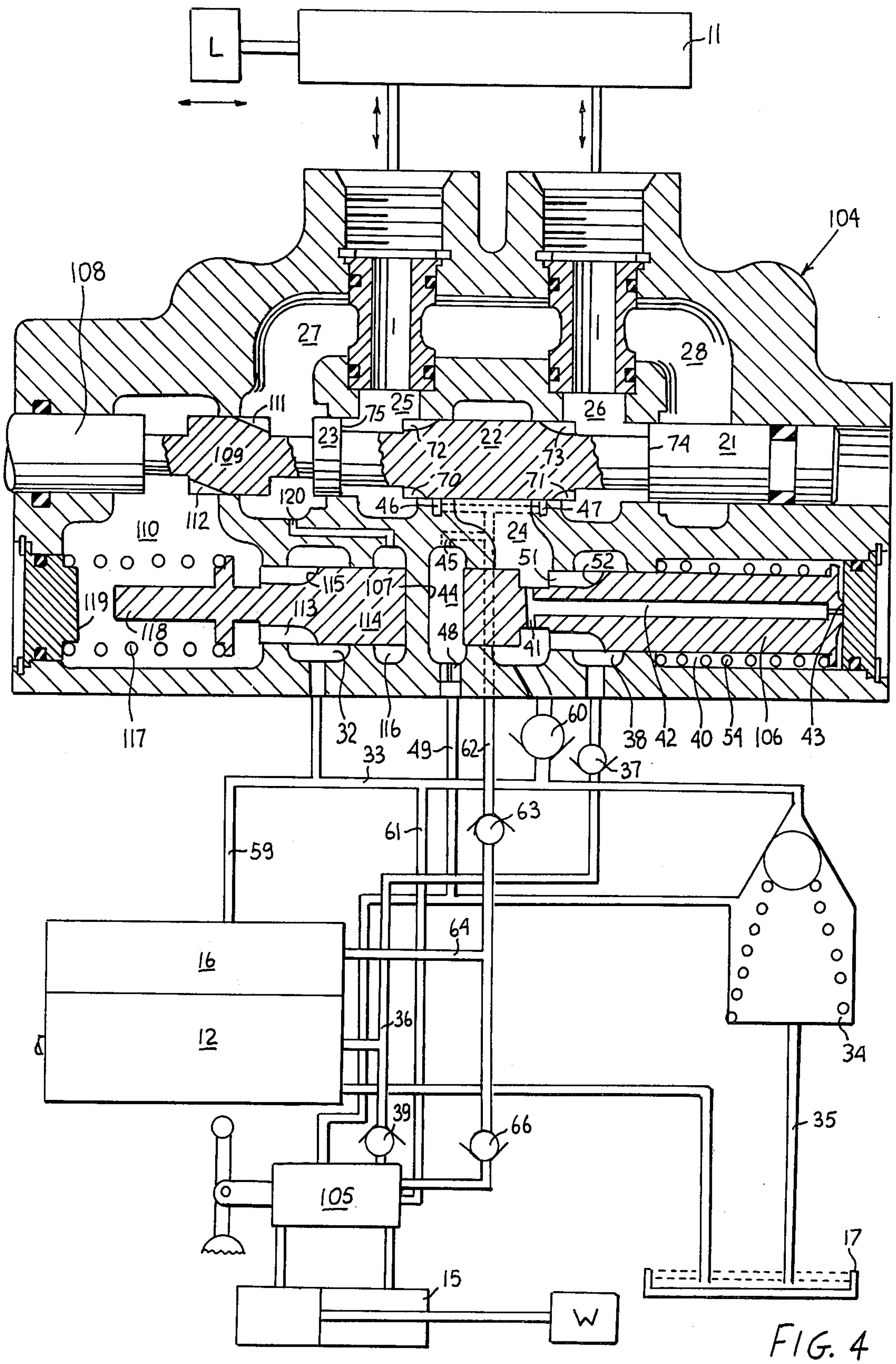
FIG. 4 is a longitudinal sectional view of an embodiment of a flow control valve having a positive load control responsive to actuator upstream pressure differential and negative load control responsive to actuator downstream pressure differential with other system components the same as in FIG. 1.

Referring now to FIG. 4 flow control valves, generally designated as 104 and 105, are connected by an identical circuit as flow control valves 10 and 14 of FIG. 1. The positive load control of flow control valve 104 performs in a similar way as positive load control of flow control valve 10 of FIG. 1. After starting of fixed displacement pump 12 minimum standby pressure, generated in the inlet chamber 38 and the supply chamber 24, conducted through passages 41, 42 and restriction orifice 43 moves the positive load control spool 106 to a point, where throttling edges 52 cut off communication between the inlet chamber 38 and the supply chamber 24. Exhaust pressure resulting from the setting of the exhaust relief valve 34, through exhaust line 33 and bypass check valve 60, is transmitted to the supply chamber 24 from where it is conducted through passages 41, 42 and restriction orifice 43 and reacts on cross-sectional area of positive load control spool 106 moving it against surface 107. As long as pressure in the control space 44 is at a relatively low level, the positive load control spool 106 will be maintained in this position, isolating the supply chamber 24 from the inlet chamber 38.

A valve spool 108, to the right of timing surface 75, is identical to the valve spool 20 of FIG. 1. The valve spool 108 is provided with an outlet metering land 109 which in neutral position of the valve spool 108 isolates the outlet chamber 27 from a fluid unloading chamber 110. The metering land 109 is equipped with metering slots 111 and 112, which upon displacement of the metering land 109, from neutral position in either direction, connects for fluid flow the outlet chamber 27 with the unloading chamber 110. The unloading chamber 110 is connected through slots 113, of a negative load control spool 114, to the exhaust chamber 32. The negative load control spool 114 having slots 113, provided with throttling edges 115, projects into control space 116 and is biased towards position, as shown, by spring 117. The negative load control spool 114 is provided with stop 118 limiting its displacement against surface 119.

Assume that the load chamber 25 is subjected to a positive load. The initial displacement of the valve spool 108 to the right will connect the load chamber 25 through signal slot 70 with positive load port 46, while lands 21, 22 and 23 still isolate the supply chamber 24, load chambers 25 and 26 and outlet chambers 27 and 28. As previously described, when referring to FIG. 1, positive load signal, transmitted from positive load sensing port 46, through signal passage 62, check valve system and signal line 64 to the differential pressure relief valve 16 will increase the pressure in discharge line 36 to a level, which is higher by a constant pressure differential than the load pressure signal. The load pressure, transmitted through passage 45 to control space 44, will move the positive load control spool 106 to the right, opening through slots 51 communication between the inlet chamber 38 and the supply chamber 24. The bypass check valve 60 will close and communication will be maintained between the supply chamber 24 and the inlet chamber 38, as long as the differential pressure relief valve 16 maintains a constant pressure differential between the pump discharge pressure and the positive load pressure.

Further displacement of the valve spool 108 to the right will connect through timing surface 74 the load chamber 26 with outlet chambers 28 and 27, while land 22 still isolates the load chamber 25 from the supply chamber 24 and the metering land 109 still isolate the outlet chamber 27 from the unloading chamber 110. Since the load chamber 26 is subjected to low pressure no change in position of the negative load control spool 114 will take place.

Still further displacement of the valve spool 108 to the right will connect the load chamber 25, through metering slots 72, with the supply chamber 24 and will also connect through metering slot 112 the outlet chamber 27 with the unloading chamber 110. In a manner as previously described with referring to FIG. 1, the differential pressure relief valve 16 will maintain a constant pressure differential across orifice, created by displacement of metering slots 72, the flow into the load chamber 25 being proportional to the area of the orifice and therefore displacement of the valve spool 108 from its neutral position and independent of the magnitude of the load L.

Assume that while controlling positive load L through the flow control valve 104, a higher positive load W is actuated through the flow control valve 105. Higher load pressure signal from the flow control valve 105 will be transmitted through the check valve system to the differential pressure relief valve 16, which will now maintain system pressure, higher by a constant pressure differential, than pressure generated by positive load W. In a manner, as previously described, when referring to FIG. 1, the pressure drop through metering slots 72 will increase, therefore increasing the pressure differential between space 40 and control space 44. The positive load control spool 106 will move into its modulating position, throttling with throttling edges 52 the fluid flowing from the inlet chamber 38 to the supply chamber 24, to maintain a constant pressure differential between the supply chamber 24 and the load chamber 25, thus controlling fluid flow through metering slots 72.

Assume that the load chamber 26 is subjected to a negative load L and that the valve spool 108 is displaced from its neutral position to the right while, as previously described, the positive load control spool 106 is maintained by the system exhaust pressure against surface 107, blocking communication between the inlet chamber 38 and the supply chamber 24. Initial displacement of the valve spool 108 will connect through signal slot 70 the load chamber 25 with the positive load sensing port 46. Since the load chamber 25 is subjected to low pressure neither the differential pressure relief valve 16 nor the positive load control spool 106 will react to it.

Further displacement of valve spool 108 will connect negative load pressure from load chamber 26 with outlet chambers 28 and 27, while the metering land 109 still isolates the outlet chamber 27 from the unloading chamber 110. Negative load pressure, from the outlet chamber 27 will be transmitted through passage 120 to control space 116, where reacting on the cross-sectional area of the negative load control spool 114 will move it against the bias of the spring 117, all the way to the left, blocking communication between the unloading chamber 110 and the exhaust chamber 32.

Further displacement of valve spool 108 to the right will connect through metering slot 112 the outlet chamber 27 with the unloading chamber 110, while also connecting through metering slots 72 the load chamber 25 with the supply chamber 24. Since the unloading chamber 110 is isolated by position of the negative load control spool 114, the pressure in the unloading chamber 110 will begin to rise, until it will reach a level, at which force generated on the cross-sectional area of the negative load control spool 114, by the pressure in control space 116, will equal the sum of force generated on the same cross-sectional area by the pressure in the unloading chamber 110 and the biasing force of the spring 117. At this point the negative load control spool 114 will move from left to right into a modulating position, in which fluid flow from the unloading chamber 110 to the exhaust chamber 32 will be throttled by the throttling edges 115, to automatically maintain a constant pressure differential, equivalent to biasing force of the spring 117, between the outlet chamber 27 and the unloading chamber 110. Since during control of negative load a constant pressure differential is maintained across the orifice, created by the displacement of metering slot 112, by the throttling action of negative load control spool 114, fluid flow through metering slot 112 will be proportional to the displacement of the valve spool 108 and constant for each specific position of metering slot 112, irrespective of the change in the magnitude of the negative load L. Throttling loss, through metering slots 72, will maintain pressure in the load chamber 25, the positive load sensing port 46 and control space space 44 at a low level, with the positive load control spool 106 blocking passage between the inlet chamber 38 and the supply chamber 24. Since the supply chamber 24 is connected by the bypass check valve 60 with the pressurized exhaust circuit of flow control valves 104 and 105, replenishing flow to the load chamber 25 and inlet of the actuator 11 will be supplied from the pressurized exhaust circuit, at a pressure level as dictated by the setting of the exhaust relief valve 34 and not from the pump circuit. In this way, during control of negative load, inlet flow requirement of the actuator is not supplied from the pump circuit, conserving the pump flow and increasing system efficiency. If negative load pressure is not sufficiently high to provide constant pressure drop through metering slot 112, the negative load control spool 114 will move to the right from its modulating and throttling position and the control system will revert to its positive load mode of operation, providing the energy to load L from the pump circuit, to maintain a constant pressure differential across metering slot 72, when will also maintain a constant pressure differential across metering slot 112. During control of negative load the inlet flow requirement of the actuator is supplied from the outlet flow from the actuator, bypass flow from the differential pressure relief valve 16 and the exhaust circuits of all of the other system flow control valves.

Although the preferred embodiments of this invention have been shown and described in detail it is recognized that the invention is not limited to the precise form and structure shown and various modifications and rearrangements as will occur to those skilled in the art upon full comprehension of this invention may be resorted to without departing from the scope of the invention as defined in the claims.

What is claimed is:

1. A valve assembly supplied with pressure fluid by a pump, said valve assembly comprising a housing having a fluid inlet chamber, a fluid supply chamber, first and second load chambers, load pressure sensing means operable to transmit a control signal to control means operable to vary flow delivered from said pump to said inlet chamber, and fluid exhaust means, first valve means for selectively interconnecting said fluid load chambers with said load pressure sensing means, said fluid supply chamber and said fluid exhaust means, variable metering orifice means responsive to movement of said first valve means and operable to throttle fluid flow between said fluid supply chamber and said load chambers, second valve means having inlet fluid throttling means and inlet fluid isolating means between said fluid inlet chamber and said fluid supply chamber, said second valve means having means responsive to pressure differential across said variable metering orifice means, and fluid replenishing means operable to supply fluid flow from said fluid exhaust means to one of said load chambers which is not pressurized when said fluid isolating means isolates said fluid supply chamber from said fluid inlet chamber.

2. A valve assembly as set forth in claim 1 wherein said fluid replenishing means has exhaust fluid pressurizing means in said fluid exhaust means.

3. A valve assembly as set forth in claim 2 wherein check valve means interconnects for one way fluid flow said exhaust fluid pressurizing means and said fluid load chamber which is not pressurized.

4. A valve assembly as set forth in claim 1 wherein said fluid replenishing means has interconnecting means to interconnect for fluid flow said fluid supply chamber and said fluid exhaust means when said fluid isolating means isolates said fluid supply chamber from said fluid inlet chamber.

5. A valve assembly as set forth in claim 4 wherein said interconnecting means has check valve means to interconnect for one way fluid flow said fluid exhaust means and said fluid supply chamber.

6. A valve assembly as set forth in claim 1 wherein said inlet fluid throttling means has means operable to control fluid flow from said fluid inlet chamber to said fluid supply chamber to maintain said pressure differential across said variable metering orifice means at a relatively constant level when one of said load chambers is interconnected with said fluid supply chamber and said load chamber is pressurized.

7. A valve assembly as set forth in claim 1 wherein said first valve means has outlet variable metering orifice means operable to throttle fluid flow between said load chambers and said fluid exhaust means, and a third valve means responsive to pressure differential across said outlet variable metering orifice means and operable to maintain said pressure differential constant when one of said load chambers is connected to said exhaust means and said load chamber is pressurized.

8. A valve assembly as set forth in claim 7 wherein said housing has a fluid outlet chamber communicable by said first valve means with said first and second load chambers, said outlet variable metering orifice means operable to throttle fluid flow between said fluid outlet chamber and said fluid exhaust means.

9. A valve assembly as set forth in claim 8 wherein said third valve means is operable to throttle fluid flow down stream of said outlet variable metering orifice means.

10. A valve assembly as set forth in claim 1 wherein said inlet fluid isolating means has means responsive to pressure in said fluid supply chamber.

11. A valve assembly as set forth in claim 1 wherein said load pressure sensing means includes control signal check valve means.

12. A valve assembly as set forth in claim 11 wherein said load pressure sensing means has leakage orifice means upstream of said control signal check valve means.

13. A valve assembly as set forth in claim 2 wherein constant pressure reducing valve means interconnects said inlet chamber and said fluid replenishing means upstream of said exhaust fluid pressurizing means.

* * * * *